United States Patent [19]

Droege

[11] Patent Number: 5,945,084
[45] Date of Patent: Aug. 31, 1999

[54] LOW DENSITY OPEN CELL ORGANIC FOAMS, LOW DENSITY OPEN CELL CARBON FOAMS, AND METHODS FOR PREPARING SAME

[75] Inventor: Michael W. Droege, Livermore, Calif.

[73] Assignee: Ocellus, Inc., Alameda, Calif.

[21] Appl. No.: 08/903,203

[22] Filed: Jul. 5, 1997

[51] Int. Cl.⁶ .................................. D01F 9/12; C08J 9/28
[52] U.S. Cl. .................... 423/447.4; 264/29.1; 264/29.5; 423/445 R; 501/99; 502/418; 521/63; 521/64; 521/181; 521/136; 521/918
[58] Field of Search ............................... 521/64, 181, 63, 521/136, 918; 423/447.4, 445 R; 501/99; 502/418

[56] References Cited

U.S. PATENT DOCUMENTS

| | | | |
|---|---|---|---|
| 4,873,218 | 10/1989 | Pekala | 502/468 |
| 4,992,254 | 2/1991 | Kong | 423/449 |
| 4,997,804 | 3/1991 | Pekala | 502/418 |
| 5,047,225 | 9/1991 | Kong | 521/64 |
| 5,086,085 | 2/1992 | Pekala | 521/187 |
| 5,232,772 | 8/1993 | Kong | 428/408 |
| 5,260,855 | 11/1993 | Kaschmitter et al. | 264/28 |
| 5,358,802 | 10/1994 | Mayer et al. | 429/218 |
| 5,393,619 | 2/1995 | Mayer et al. | 429/253 |
| 5,402,306 | 3/1995 | Mayer et al. | 361/502 |
| 5,420,168 | 5/1995 | Mayer et al. | 521/99 |
| 5,508,341 | 4/1996 | Mayer et al. | 521/181 |
| 5,529,971 | 6/1996 | Kaschmitter et al. | 502/416 |
| 5,626,977 | 5/1997 | Mayer et al. | 252/502 |

FOREIGN PATENT DOCUMENTS

| | | |
|---|---|---|
| WO 94/22943 | 10/1994 | WIPO . |
| WO 95/06002 | 3/1995 | WIPO . |

OTHER PUBLICATIONS

Pekala et al., "Aerogels Derived From Multifunctional Organic Monomers," *Journal of Non–Crystalline Solids*, vol. 145, Nos. 1/3, pp. 90–98 (1992).

Pekala et al., "Structure and Performance of Carbon Aerogel Electrodes," *Mat. Res. Soc. Symp. Proc.*, vol. 349, pp. 79–85 (1994).

Tamon et al., "Porous Structure of Organic and Carbon Aerogels Synthesized by Sol–Gel Polycondensation of Resorcinol with Formaldehyde," *Carbon*, vol. 35, No. 6, pp. 791–796 (1997).

Bock, V., Fischer, U., Klett, U., Fricke, J., "Kohlenstoff–Aerogele—Nanoporose, Electrisch Leitfahige Materialien," *GDCH Monographien*, 1996, Bd. 3, pp. 471–490 (English language translation provided).

Bock, V., Emmerling, A., Saliger, R., Fricke, J., "Structural Investigation of Resorcinol Formaldehyde and Carbon Aerogels Using SAXS and BET," *Journal of Porous Materials*, 1997, vol. 4, pp. 287–294.

Fischer, U., Saliger, R., Bock, V., Petricevic, R., Fricke, J., "Carbon Aerogels as Electrode Material in Supercapacitors," *Journal of Porous Materials*, 1997, vol. 4, pp. 281–285.

Saliger, R., Bock, V., Petricevic, R., Tillotson, T., Geis, S., Fricke, J., "Carbon Aerogels from Dilute Catalysis of Resorcinol with Formaldehyde," *Journal of Non–Crystalline Solids*, 1997, vol. 221, pp. 144–150.

Mayer et al., 1993, "The Aerocapacitor: An Electrochemical Double–Layer Energy–Storage Device," *J. Electrochem. Soc.*, 1993, vol. 140, pp. 446–451.

Pekala et al., 1982, "Resorcinol–Formaldehyde Aerogels and Their Carbonized Derivatives," *Polymer Preprints*, vol. 39, pp. 221–223.

Pekala et al., 1992, "Carbon Aerogels and Xerogels," *Mat. Res. Soc. Symp. Proc.*, vol. 270, pp. 3–14.

Pekala et al., 1995b, "Electrochemical Behavior of Carbon Aerogels Derived from Different Precursors," *Mat. Res. Soc. Symp. Proc.*, vol. 393, pp. 413–419.

Pekala, 1989a, "Organic Aerogels from the Polycondensation of Resorcinol with Formaldehyde," *J. Materials Science*, vol. 24, pp. 3221–3227.

Tran et al., 1996, "A Comparison of the Electrochemical Behavior of Carbon Aerogels and Activated Carbon Fiber Cloths," *Mat. Res. Soc. Symp. Proc.*, vol. 431, pp. 461–465.

*Primary Examiner*—Morton Foelak
*Attorney, Agent, or Firm*—Morrison & Foerster LLP

[57] ABSTRACT

This pertains to the general field of gels, foams, and aerogels, particularly, to low density open cell organic foams and low density open cell carbon foams, and methods for preparing them. These low density open cell organic foams are derived from organic gels which may be prepared from hydroxylated benzenes (such as phenol, catechol, resorcinol, hydroquinone, and phloroglucinol) and aldehydes (such as formaldehyde and furfural) using lower than conventional catalyst concentrations (e.g, an R/C value of greater than about 1000, yielding an initial room temperature pH typically lower than about 6.0). These organic foams are characterized by relatively large particle and pore sizes, high porosity, and high surface area. Low density open cell carbon foams derived from such organic foams are also shown, as are methods for preparing same. These carbon foams are also characterized by relatively large particle and pore sizes, high porosity, high surface area, and high electrical capacitance. Low density open cell carbon foam/carbon substrate composites and methods for preparing them are also shown.

68 Claims, No Drawings

LOW DENSITY OPEN CELL ORGANIC FOAMS, LOW DENSITY OPEN CELL CARBON FOAMS, AND METHODS FOR PREPARING SAME

TECHNICAL FIELD

This invention pertains to the general field of gels, foams, and aerogels. More particularly, the present invention pertains to low density open cell organic foams and low density open cell carbon foams, and methods for preparing them. More specifically, the present invention pertains to low density open cell organic foams derived from organic gels which are prepared from hydroxylated benzenes (such as phenol, catechol, resorcinol, hydroquinone, and phloroglucinol) and aldehydes (such as formaldehyde, furfural, glutaraldehyde, and glyoxal) using lower than conventional catalyst concentrations (e.g., an R/C value of greater than about 1000, yielding an initial room temperature pH typically lower than about 6.0), as well as methods for preparing same. These organic foams are characterized by relatively large particle and pore sizes, high porosity, and high surface area. The present invention also pertains to low density open cell carbon foams derived from such organic foams, as well as methods for preparing same. These carbon foams are also characterized by relatively large cell sizes, high porosity, high surface area, and high electrical capacitance. The present invention also pertains low density open cell carbon foam/carbon substrate composites, and methods for preparing same.

BACKGROUND

Throughout this application, various publications, patents, and published patent applications are referred to by an identifying citation; full citations for these documents may be found at the end of the specification immediately preceding the claims. The disclosures of the publications, patents, and published patent specifications referenced in this application are hereby incorporated by reference into the present disclosure to more fully describe the state of the art to which this invention pertains.

Gels are a unique class of materials which exhibit solid-like behavior resulting from a continuous three-dimensional framework extending throughout a liquid. This framework consists of molecules interconnected through multifunctional junctions. These junctions can be formed, for example, through covalent crosslinking, crystallization, ionic interactions, hydrogen bonding, or chain entanglements. In some cases, junction formation is reversible and the gels revert to liquid-like behavior upon a change in temperature.

Gels have been synthesized for a variety of applications. For example, gels have been used in the electrophoresis of protein mixtures, as chromatographic packing material, and as a contact lens material. Gels have also been used as intermediates to produce other products. For example, gels have been used in the fabrication of high modulus fibers, membranes, metal oxide ceramics, and low density materials (often referred to as foams, aerogels, and xerogels).

The nomenclature of foams, aerogels, and xerogels is often arbitrary, confusing, and inconsistent. These terms generally pertain porous, lightweight, relatively low density materials.

Generally, the term "foam" is used to refer to low density porous materials which may often be conveniently and simplistically characterized as dispersions of gas bubbles in a material, which material may be liquid or solid. Foams have found widespread utility in a variety of applications. For example, foams formed from organic polymers have found use in insulation, construction, filtration, and related industries.

Foams are often conveniently classified as closed cell foams or open cell foams. Closed cell foams are primarily characterized by having sealed pore volumes from which the entrapped gas cannot easily escape. A common example of a closed cell foam is polystyrene. In contrast, open cell foams are primarily characterized by having pore volumes which are not sealed, and are often interconnected, and from which entrapped gas can escape or re-enter.

Several classes of open cell foams have been somewhat arbitrarily identified. The term "aerogel" is often used to identify one class of open cells foams characterized by transparent, low density, high surface area porous solids composed of interconnected colloidal-like particles or fibrous chains. These materials are characterized by morphological structures (e.g., particle sizes and spacings, pores size and spacings) having dimensions which are less than about 100 nm. Consequently, these materials are visibly transparent.

Aerogels are also characterized by the nature of their porosity (e.g., pore size distribution): typically, they possess micro-pores, meso-pores, and macro-pores. Micro-pores generally include pores with dimensions less than about 2 nm; these are often pores within or between individual particles. Meso-pores are generally pores with dimensions about 2 to about 50 nm; these are often associated with the spacing between particles or chains of particles. In aerogels, macro-pores are generally pores with dimensions about 50 nm to about the 100 nm. The high surface areas of aerogels (e.g., 300 to 1000 $m^2/g$) is attributed to the porous nano-structure.

The term "xerogel" is often used to identify another class of open cells foams which are, in many respects, similar to aerogels (e.g., lightweight, porous, high surface area, and transparent), but are notably more dense than aerogels. In this way, a xerogel is often described as a densified version of an aerogel; that is, wherein the material has contracted to bring particles and particle chains closer together. Thus, xerogels are characterized by a reduction in the number of macro- and meso-pores, often ascribed to the compaction of particles and the removal of voids between particles and chains of particles. The observed surface area for xerogels (often as high as 500 $m^2/g$) is primarily a result of a large number of micro-pores within and between individual particles.

Another class of open cells foams, often referred to simply as "foams," are porous solids characterized by being opaque and having low density and relatively high surface area. These materials are characterized by some morphological structures (e.g., particle sizes and spacings, pores size and spacings) having dimensions which are generally larger than 100 nm. Consequently, these materials are visibly opaque.

An important class of organic foams may be derived from the gels formed by the polycondensation of a substituted (e.g., hydroxylated, often polyhydroxylated) aromatic compounds with an aldehyde. Like other chemically-linked gels, the small cell/pore size of the resulting organic gel (typically less than about 50 nm) necessitates complex, intensive, and expensive drying methods to yield an organic aerogel. Large capillary forces at the liquid-vapor interface cause the gel to shrink or crack if the solvent is removed by simple evaporation yielding substantially densified and undesired products.

To overcome this limitation, new methods to effect drying have been developed. By using supercritical extraction of the pore fluid, e.g., by evaporation, apparently no surface tension is exerted across the cells/pores, and the dried aerogel retains much of the original morphology of the initial gel. See, for example, Pekala, 1989a. In this method, the water in the pores of the water-containing gel is exchanged with acetone to form an acetone-containing gel; the acetone in the acetone-containing gel is then exchanged with liquid carbon dioxide which is then removed under supercritical conditions (e.g., $CO_2$ critical temperature=31° C., critical pressure=7.4 mPa) to produce the dried organic aerogel. Alternatively, certain organic gels can often be dried, for example, by solvent exchange. See, for example, Mayer et al., 1995a. In this method, the water in the pores of the water-containing gel is exchanged with acetone to form an acetone-containing gel; the acetone in the acetone-containing gel is then exchanged with cyclohexane; and the cyclohexane in the pores of the cyclohexane-containing gel is then removed by simple evaporation to produce the dried organic aerogel.

An important class of organic gels which have been the focus of efforts to produce aerogels and xerogels are the hydroxylated benzene-aldehyde gels; that is, gels obtained by the polycondensation of hydroxylated benzene compounds, such as phenol, resorcinol, catechol, hydroquinone, and phloroglucinol, with aldehydes, such as formaldehyde, glyoxal, glutaraldehyde, and furfural. Particularly common examples are the resorcinol-formaldehyde (i.e., RF) gels. See, for example, Pekala, 1989a, 1989b, 1991, and 1992.

Resorcinol, also referred to as 1,3-dihydroxybenzene (i.e., $C_6H_4(OH)_2$), undergoes most of the typical reactions of phenol (i.e., $C_6H_5OH$), but at a much faster rate because of the enhanced electron density in the 2-, 4-, and 6-ring positions. Resorcinol, like phenol, is known to react with formaldehyde (i.e., $CH_2O$) under alkaline conditions to form mixtures of addition and condensation products. The principle reactions involved include: (1) the formation of hydroxymethyl (—$CH_2OH$) derivatives of resorcinol and (2) condensation of the hydroxymethyl derivatives to form methylene (—$CH_2$—) and methylene ether (—$CH_2OCH_2$—) bridged compounds.

A resorcinol-formaldehyde polymer (so-called RF polymer) may be formed in which resorcinol monomers are linked by methylene and methylene ether bridges to form a chemically crosslinked network.

A simple example is illustrated below.

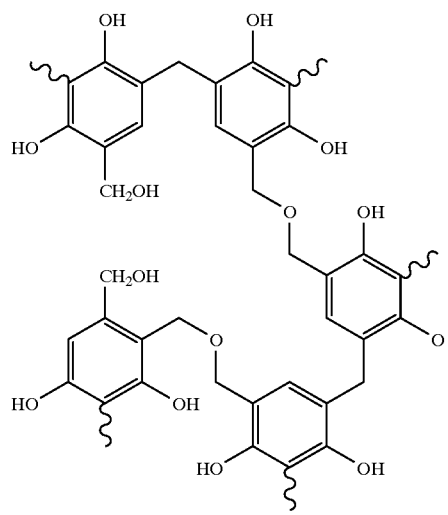

The resorcinol-formaldehyde reaction, often referred to as the RF reaction, is usually performed in aqueous solution. Resorcinol, a white solid, is usually dissolved in a an aqueous formaldehyde solution (37.6 wt % aqueous formaldehyde is widely commercially available), and a suitable catalyst, such as sodium carbonate ($Na_2CO_3$), often as a dilute aqueous solution, is added. In some cases, an acid catalyst, such as trifluoroacetic acid, is employed. The solution is gently warmed to initiate the gelation reaction, and to form a chemically cross-linked RF gel. If the gel is properly formulated, it is often possible to dry the gel to yield an RF aerogel, but only using complex, intensive, and expensive methods such as supercritical extraction, subcritical evaporation, and solvent exchange methods.

Carbon foams, and more particularly carbon foams having densities of less than about 100 mg/cm$^3$ and cell sizes of less than about 25 microns, have been prepared using a variety of methods, including pyrolysis of an organic polymer aerogel under an inert atmosphere such as $N_2$ or argon. See, for example, Kong, 1991a, 1991b, and 1993. Owing primarily to their high electrical conductivity, carbon foams have found wide utility in electrode applications such as energy storage devices (e.g., capacitors and batteries), fuel cells, and electrocapacitive deionization devices. See, for example, Pekala et al., 1995a; Mayer et al., 1994, 1995b, 1995c, 1996, 1997; and Kashmitter et al., 1993 1996. Carbon foams have also found utility in variety of other applications, including filtration media, catalyst supports, and structural media.

Similarly, once obtained, the dried RF aerogel may often be converted to a carbon aerogel by pyrolysis under an inert atmosphere such as $N_2$ or argon. Such carbon aerogels are electrically conducting and are particularly useful as electrodes in double layer capacitors for energy storage or for capacitive deionization (see, for example, Pekala et al., 1995b). Carbon aerogels which are useful in capacitance applications typically possess a porous carbon matrix comprised of interconnected carbon particles and are characterized primarily by a large number of micro-pores and meso-pores, found within and between the particles.

Since the carbon aerogel is derived from the RF organic aerogel (via pyrolysis), it is expected that the structure of the RF aerogel will impact the properties of the carbon aerogel. In principle, the particle size and pore structure of the carbon aerogel is patterned after the microstructure of the RF aerogel.

A critical parameter impacting the morphology of the RF aerogel is the value of the reaction parameter "R/C", discussed in more detail below, is the molar concentration of [resorcinol or its functional equivalent] divided by the molar concentration of [catalyst]. At high catalyst concentrations (e.g., R/C~50), very small RF particles (e.g., ~9 nm) are formed, whereas at low catalyst concentrations (e.g., R/C~900), large RF particles (e.g., ~65 nm) are formed. Also, at high catalyst concentrations (e.g., R/C~50), high surface areas (e.g., 900 $m^2/g$) are found, whereas at low catalyst concentrations (e.g., R/C~300), lower surface areas (e.g., ~390 $m^2/g$) are found. The high surface areas found with high catalyst concentrations may be explained by the formation of a large number of very small particles. At higher catalyst concentrations (e.g., R/C<300–400), the RF gels are transparent and homogenous and result in dried RF aerogels that are dark red in color but still transparent to visible light. At lower catalyst concentrations (e.g., R/C>300–400), the organic gels are typically opaque and result in dried organic aerogels which are not transparent to visible light (due to the formation of large particles and pore spaces which scatter visible light). Since they are not transparent, the latter materials must have particle and/or pore sites larger than about 100 nm. and, as a result, are often no longer considered to be aerogels.

For RF aerogels prepared at low catalyst concentration (high R/C), it has been observed that the surface area of a carbon aerogel was greater than the surface area of the RF aerogel from which it was obtained (see, for example, Pekala et al., 1982). It has been suggested that this increase in surface area is due to a decrease in particle size and the formation of additional pores as volatile by-products are released during pyrolysis. This trend is reversed for RF aerogels prepared at high catalyst concentration (low R/C) because the particles are already so small that they, instead, tend to fuse during carbonization leading to a loss of surface area.

It has been suggested that only the surface of the particles in the meso-pore region (2 to 50 nm) are responsible for formation of the electrical double layer that gives rise to the energy storage characteristics of the carbon aerogel (see, for example, Mayer et al., 1993). In this way, materials which have few or no meso-pores, such as xerogels, have very low electrical capacitance, whereas materials with substantial numbers of meso-pores often have substantial electrical capacitance. Carbon aerogels derived (via pyrolysis) from RF aerogels having a solids content of about 40% w/v and greater, possess mesopore distribution of $\leq 7$ nm (Tran et al). The capacitance of RF-derived carbon aerogels has been observed to peak at densities of 500 mg/$cm^3$ and higher.

In the known methods for forming aerogels from hydroxylated benzenes (such as resorcinol) and aldehydes (such as formaldehyde), reaction parameters such as pH and solids content, are carefully controlled so that a useful product (e.g., dried aerogel) may be obtained from the gel. That is, reaction parameters are carefully controlled so that the resulting gel can be successfully dried to form an aerogel which retains much of the morphology of the original gel.

For example, it has been reported that RF gels formed using low catalyst concentrations (high R/C, initial room temperature pH below 6.0) yield materials which, upon drying, form opaque materials characterized by large particles and large pore/cell size, and generally not considered to be aerogels. It has thus been generally believed that the RF gels formed using unconventional reaction parameters are not useful in the formation of RF aerogels and their related carbon foams, primarily because such gels either have an undesirable morphology or are thought to be unable to retain their morphology upon drying. Much of the effort in the field of low density open cell foams has been directed to aerogels and xerogels, which are invariably derived from transparent gels. Consequently, there has been little interest in the preparation and/or drying of gels formed under reaction conditions that typically lead to opaque gels, and little expectation that such opaque gels would yield foams with many of the properties of aerogels.

In conventional methods, the pH range of the reaction mixture, which is primarily determined by the concentration of catalyst, is carefully controlled to yield a reaction mixture pH which falls in the narrow range of 6.5 to 7.4. Typically, the reaction parameter R/C, which is the ratio of the number of moles of hydroxylated benzene compound to the number of moles of catalyst and which thus helps determine the pH of the reaction mixture, is selected to be from about 50 to about 400. Also in conventional methods, the solids content is carefully controlled. Typically, the reaction parameter R, which is the weight % of the hydroxylated benzene compounds and aldehydes in the reaction mixture with respect to total volume, is selected to be from about 5–40% w/v.

Using these conventional methods and reaction parameters, gels are obtained which may be successfully dried (albeit using complex, intensive, and expensive methods) to produce organic aerogels and, upon pyrolysis, carbon aerogels, both of which possess typical aerogel properties, such as transparency (except for carbon aerogels), high surface area, ultrafine particle size, and porosity. However, these conventional gels cannot survive simple evaporative drying of high surface tension solvents such as the water pore fluid. Upon simple evaporative drying, the gels shrink and crack. The resulting products do not retain the morphology of the original gel.

We have found, inter alia, that by moving outside of the conventional parameters, and more particularly, by moving to lower catalyst concentrations (i.e., an R/C value of greater than about 1000, yielding an initial room temperature pH of lower than about 6.0), new organic gels are obtained which, upon curing, yield strong organic gels. These new organic gels, unlike the gels produced using conventional reaction parameters, are sturdy enough to withstand simple (and cheap) evaporative drying of the solvent water contained in the pores—perhaps due to the large size cells and pore spaces—without the need for complex, intensive, and expensive drying methods such as supercritical evaporation, subcritical evaporation, or solvent exchange methods. The resulting unique low density open cell organic foams have many of the useful properties associated with aerogels. In this way, new low density open cell organic foams are obtained which are characterized by relatively large particle and pore sizes, high porosity, and high surface area. These organic aerogels may be pyrolyzed to form new low density open cell carbon foams also characterized by relatively large particle and pore sizes, high porosity, high surface area, and further characterized by high capacitance.

BRIEF DESCRIPTION OF THE INVENTION

This invention pertains to the general field of gels, foams, and aerogels. More particularly, the present invention pertains to low density open cell organic foams and low density open cell carbon foams, and methods for preparing them. More specifically, the present invention pertains to low density open cell organic foams derived from organic gels which are prepared from hydroxylated benzenes (such as phenol, catechol, resorcinol, hydroquinone, and phloroglucinol) and aldehydes (such as formaldehyde, furfural, glutaraldehyde, and glyoxal) using lower than conventional catalyst concentrations (e.g., an R/C value of greater than about 1000, yielding an initial room temperature pH typically lower than about 6.0). The methods for preparing the low density open cell organic foams are also discussed. These organic foams are characterized by relatively large particle and pore sizes, high porosity, and high surface area. An important aspect of this invention involves the use of non-exotic solvent removal steps, e.g., atmospheric evaporative water removal.

The present invention also pertains to low density open cell carbon foams derived from such organic foams, as well as methods for preparing those low density open cell carbon foams. The carbon foams are also characterized by relatively large cell sizes, high porosity, high surface area, and high electrical capacitance. The present invention also pertains to low density open cell carbon foam/carbon substrate composites and the methods of making those composites.

As will become apparent, preferred features and characteristics of one aspect of the invention are applicable to any other aspect of the invention.

DETAILED DESCRIPTION OF THE INVENTION

A. Methods For the Preparation of Organic Gels

The organic gels of the present invention are prepared by the polycondensation of one or more hydroxylated benzene compounds with one or more aldehydes in the presence of a catalyst, under specific reaction conditions determined by values of certain reaction parameters, such as R/C and R. In this way, an organic gel is obtained, which is characterized by relatively large particle and pore sizes, and which can survive simple evaporative drying of the solvent water to yield a low density open cell organic foam. It is postulated that the large particle and pore sizes help to minimize capillary forces during drying, thereby permitting the organic gels to be dried, particularly from high surface tension solvents such as water by using simple evaporative drying methods.

Thus, in one embodiment, the present invention pertains to methods for preparing a chemically crosslinked organic gel comprising the steps of:

(a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and, (b) heating said reaction mixture to form said organic gel.

The term "hydroxylated benzene compound," as used herein, relates to compounds comprising at least one benzene ring, which benzene ring possesses at least one hydroxyl group (i.e., —OH). Examples of suitable hydroxylated benzene compounds include phenol, catechol, resorcinol, hydroquinone, and phloroglucinol.

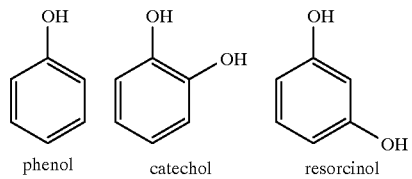

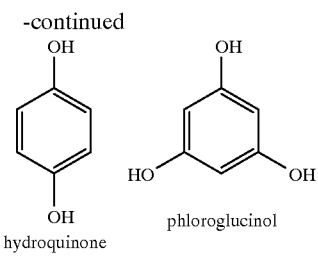

Typically, the hydroxylated benzene compounds are provided as a solid. A number of exemplary hydroxylated benzene compounds, including phenol, catechol, resorcinol, hydroquinone, and phloroglucinol, are widely commercially available in high purity. Also, many hydroxylated benzene compounds are commercially available in combination with a small amount of an aldehyde (e.g., formaldehyde) in a partially condensed form, that is, as low molecular weight polymers. These materials may also be useful hydroxylated benzene compounds.

The term "aldehyde" is used herein in the conventional sense, and relates to organic compounds which comprise an aldehyde group (i.e., —CHO). Many aldehydes may be represented by the formula R—CHO, wherein R is an aldehyde substituent. Examples of suitable aldehydes include formaldehyde, glyoxal, furfural, and glutaraldehyde.

Typically, the aldehydes are provided as liquids, either as the pure aldehyde, or as an aqueous solution. For example, formaldehyde is widely commercially available as a 37.6% by weight aqueous solution.

The term "catalyst," as used herein, relates to compounds which act as a catalyst for the reaction between a hydroxylated benzene compound and an aldehyde. In one embodiment, the catalyst is a base catalyst (i.e., is able to act as a Bronsted base). Examples of suitable base catalysts include carbonates, such as sodium carbonate (i.e., $Na_2CO_3$) and potassium carbonate (i.e., $K_2CO_3$). In one embodiment, the catalyst is an acid catalyst (i.e., is able to act as a Bronsted acid). An example of a suitable acid catalyst is trifluoroacetic acid (i.e., $CF_3COOH$) as may be used in aging studies.

Typically, the catalyst is provided as a solid or as an aqueous solution. For example, high purity sodium carbonate is widely commercially available. A suitable aqueous solution may be prepared, for example, by dissolving an appropriate amount of sodium carbonate in distilled deionized water to yield a solution having the desired concentration (e.g., 0.1 M sodium carbonate). Also, trifluoroacetic acid is widely commercially available.

The reaction parameter R/C is the ratio of the number of moles of hydroxylated benzene compound to the number of moles of catalyst in the reaction mixture (usually measured prior to formation of the organic gel). For example, if a reaction mixture is prepared using 1 mole of resorcinol and 0.5 millimoles of sodium carbonate, the resulting value of R/C is 1/0.0005 or 2000.

The organic gels of the present invention, and the low density open cell organic foams obtained therefrom, are characterized by being produced from a reaction mixture having a low catalyst concentration as determined by an R/C value of greater than 1000 (usually in the range of 1000 to about 20000). In one embodiment, the R/C value is greater than 1100 (usually in the range of 1100 to about 20000). In another embodiment, the R/C value is greater than 1500 (usually in the range of 1500 to about 20000). In yet another embodiment, the R/C value is greater than 2000 (usually in the range of 2000 to about 20000). In still another embodiment, the R/C value is greater than 3000 (usually in the range of 3000 to about 20000). The initial room temperature pH of the resulting reaction mixture is determined primarily by the nature of the catalyst and the value of R/C. For a base catalyst, increasing R/C (e.g., decreasing base catalyst concentration) generally causes a decrease in the initial room temperature pH.

Another reaction parameter, R, is the % solids w/v (weight to volume) of the hydroxylated benzene compounds and aldehydes in the reaction mixture with respect to the total volume of the reaction mixture (usually measured prior to formation of the organic gel). For example, if a resorcinol/formaldehyde/sodium carbonate/water reaction mixture was prepared using 12.35 g of resorcinol and 6.73 g of formaldehyde (as provided, for example, from 17.91 g of 37.6% aqueous formaldehyde) and the resulting reaction mixture had a volume of 31.8 ml, then the value of R is (12350+6730)/31.8×100 or 60% w/v.

In one embodiment, the organic gels of the present invention, and the low density open cell organic foams obtained therefrom, are also characterized by being produced from a reaction mixture having an R value of greater than about 30% (usually in the range of 30% to about 80%). In another embodiment, the R value is greater than 40% (usually in the range of 40% to about 80%). In another embodiment, the R value is greater than 45% (usually in the range of 45% to about 80%). In another embodiment, the R value is greater than 50% (usually in the range of 50% to about 80%). In another embodiment, the R value is greater than 60% (usually in the range of 60% to about 80%). In another embodiment, the R value is greater than 70% (usually in the range of 70% to about 80%).

Typically, the reaction mixture is prepared in a container. Alternatively, after mixing the ingredients, the resulting reaction mixture may be transferred to a heat resistant container. Examples of heat resistant containers include those made from polypropylene and glass. The ingredients of the reaction mixture may be mixed, for example, using convention means such as stirring and shaking.

Upon forming the reaction mixture, it may optionally be allowed to stand at room temperature (i.e., 25° C.) for a standing time. Typically, the standing time is about 0.1 to about 24 hours. In one embodiment, the standing time is about 0.1 to about 2 hours.

The reaction mixture is then heated to a gelation temperature to initiate the gelation reaction, and typically held at that temperature for a gelation time, to form the desired organic gel. The gelation temperature may vary according to the gelation time, the composition of the reaction mixture, and the quantity of reaction mixture. The gelation temperature is typically from about 20 to about 70° C. In one embodiment, the gelation temperature is from about 40 to about 60° C. In one embodiment, the gelation temperature is about 50° C. The gelation time may vary according to the gelation temperature, the composition of the reaction mixture, and the quantity of reaction mixture. The gelation time is typically from about 0.1 to about 24 hours. In one embodiment, the gelation time is from about 0.1 to about 3 hours. The reaction mixture may be heated, for example, using conventional means. Typically, the reaction mixture is sealed in a heat resistant container and placed in a thermostat controlled oven. Alternatively, a continuous flow apparatus may be used. Typically, no special atmosphere is required during handling of the reagents or the reaction mixture, or during the gelation reaction.

In some embodiments, the resulting organic gel is further cured by heating the organic gel at a curing temperature for a curing time. Thus, in one embodiment, the present invention pertains to methods for preparing a cured organic gel comprising the steps of:

(a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and, (b) heating said reaction mixture at a gelation temperature for a gelation time to form an organic gel; and, (c) heating said organic gel at a curing temperature for a curing time to form said cured organic gel.

The curing temperature is usually higher than the gelation temperature used. The curing temperature may vary according to the curing time, the composition of the organic gel and the quantity of organic gel. The curing temperature is typically from about 50 to about 95° C. In one embodiment, the curing temperature is from about 60 to about 90° C. In one embodiment, the curing temperature is about 85° C. The curing time may vary according to the curing temperature, the composition of the organic gel and the quantity of organic gel. The curing time is typically from about 3 to about 72 hours. In one embodiment, the curing time is from about 6 to about 48 hours. The organic gel may be heated, for example, using conventional means. Alternatively, a continuous flow apparatus may be used. Typically, the heat resistant container which contains the organic gel is placed in a thermostat controlled oven. Again, no special atmosphere is typically required during curing.

B. Methods For the Preparation of Low Density Open Cell Organic Foams

The low density open cell organic foams of the present invention are prepared by drying organic gels of a particular formulation. Thus, in one embodiment, the present invention pertains to methods for preparing a low density open cell organic foam comprising the steps of:

(a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and, (b) heating said reaction mixture to form an organic gel; and, (c) drying said organic gel to form said low density open cell organic foam.

In another one embodiment, the present invention pertains to methods for preparing a low density open cell organic foam comprising the steps of:

(a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and, (b) heating said reaction mixture at a gelation temperature for a gelation time to form an organic gel;

(c) heating said organic gel at a curing temperature for a curing time to form a cured organic gel; and, (d) drying said cured organic gel to form said low density open cell organic foam.

Although any conventional method may be used in removing the solvent, typically water, from the pores, including, for example, supercritical evaporation, subcritical evaporation, and solvent exchange drying methods, the methods of present invention permit the use of the cheaper and simpler method of conventional air drying of that water pore fluid. Thus, in one embodiment, the drying is achieved by simple evaporative drying of a high surface tension fluid, such as water, as may be found in the organic gel pores.

That the organic gels of the present invention may be successfully dried by simple evaporative drying indicates that the organic gels, and thus the resulting low density open cell organic foams, are unique. Without wishing to be bound to any particular theory, it is postulated that the gel has larger than typical meso-pore dimensions (which result from the use of a high R/C reaction parameter), and that these larger dimensions permit the simple evaporative drying. It is possible that the formation of larger than typical particles at high R/C permits the formation of meso-pores in the particles themselves, rather than solely between particles and particle chains. It is further postulated that the further combination of a high solids content (high R value) may enhance the strength of the organic gel and further facilitate simple evaporative drying. The resulting low density open cell organic foams reflect, to a large degree, the morphology of the gel from which they were derived, and thus also possess larger than typical meso-pore dimensions. In this way, the low density open cell carbon foams derived from the organic foam (see below) also have larger than typical meso-pore dimensions.

Typically, the organic gel, or alternatively, the cured organic gel, is placed in oven and dried at a drying temperature for a drying time under a humid air atmosphere. The drying temperature may vary according the drying time, the composition of the organic gel/cured organic gel and the quantity of organic gel/cured organic gel. The drying temperature is typically from about 50 to about 150° C. In one embodiment, the drying temperature is from about 60 to about 100° C. In one embodiment, the drying temperature is about 75° C. Typical drying pressures would usually be in the neighborhood of atmospheric, e.g., −0.5 to 2.5 atm. The drying time may vary according the drying temperature, the composition of the organic gel/cured organic gel and the quantity of organic gel/cured organic gel. The drying time is typically from about 1 to about 96 hours. In one embodiment, the drying time is from about 6 to about 48 hours. In another embodiment, "non-critical drying conditions" are defined to be not those employed in supercritical evaporation or subcritical evaporation using $CO_2$.

The low density open cell organic foams of the present invention are characterized by relatively large particle and pore sizes, high porosity, and high surface area. Typically, low density open cell organic foams of the present invention have a density of about 300 to about 900 mg/cm$^3$. Typically, the low density open cell organic foams of the present invention have a surface area of about 200 to about 1000 m$^2$/g.

The low density open cell organic foams of the present invention are also characterized by a meso-pore size distribution of greater than about 5 nm (e.g., from about 5 to about 50 nm). In one embodiment, the low density open cell organic foam is characterized by a meso-pore size distribution of greater than about 7 nm (e.g., from about 7 to about 50 nm). In one embodiment, the low density open cell organic foam is characterized by a meso-pore size distribution of greater than about 10 nm (e.g., from about 10 to about 50 nm). In one embodiment, the low density open cell organic foam is characterized by a meso-pore size distribution of about 10 to about 25 nm.

The low density open cell organic foams of this invention are typically variably colored orange to deep red and may be visibly opaque. For gels prepared with a solids content of about R=50% w/v and lower, opaque gels are obtained upon gellation of the reaction mixture. Subsequent curing and drying (as previously described) of these opaque gels results in the low density open cell foams of the present invention. For gels prepared with a solids content of greater than R=50% w/v, a prolonged standing time (typically at room temperature) of up to seven days may be required to form an opaque reaction mixture. An opaque gel is formed from this opaque reaction mixture either by continuing the standing time until gellation occurs, or by heating the opaque reaction mixture until gellation occurs, as previously described. Subsequent curing and drying (as previously described) of these opaque gels results in the low density open cell organic foams of the present invention. The strength and larger particle and pore sizes of these low density open cell organic gels facilitate simple evaporative drying of the water pore fluid.

Alternatively, for those gels prepared with a solids content of greater than R=50% w/v, transparent gels are obtained by heating the transparent reaction mixture prior to the point at which the reaction mixture becomes opaque. Subsequent curing and drying (as previously described) of those transparent gels can result in transparent low density open cell organic foams. It is postulated that although the particle and pore sizes are not larger than about 100 nm., the strength of the gel and the somewhat larger particle and pore sizes (due to the high R/C value) of these low density open cell organic gels allows simple evaporative drying of the water pore fluid.

Consequently, in one embodiment, the low density open cell organic foam is opaque. In one embodiment, the low density open cell organic foam is transparent. A low density open cell organic foam of the present invention is considered to be transparent if a substantial portion of incident visible light is transmitted through the foam and can readily be detected. As discussed above, the transparency or opacity of a low density open cell organic foam arises from the dimensions of the morphological structures (e.g., particle sizes and spacings, pores size and spacings) of the foam.

C. Methods For the Preparation of Low Density Open Cell Carbon Foams

The present invention also pertains to low density open cell carbon foams which are prepared by pyrolysis in a non-reactive or inert atmosphere of the low density open cell organic foams as described above. Thus, in one embodiment, the present invention pertains to methods for preparing a low density open cell carbon foam comprising the steps of:

(a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and, (b) heating said reaction mixture to form an organic gel;

(c) drying said organic gel to form a low density open cell organic foam; and, (d) pyrolyzing said low density open cell organic foam at a high temperature to form said low density open cell carbon foam.

In another one embodiment, the present invention pertains to methods for preparing a low density open cell carbon foam comprising the steps of:

(a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and, (b) heating said reaction mixture at a gelation temperature for a gelation time to form an organic gel;

(c) heating said organic gel at a curing temperature for a curing time to form a cured organic gel;

(d) drying said cured organic gel to form a low density open cell organic foam; and, (e) pyrolyzing said low density open cell organic foam at a pyrolysis temperature to form said low density open cell carbon foam.

Pyrolysis of the low density open cell organic foam to form the low density open cell carbon foam may be performed using conventional means. Typically, the low density open cell organic foam is placed in a thermostatted oven, and heated under a compatible atmosphere to a pyrolysis temperature for a pyrolysis time. The pyrolysis temperature may vary according to the pyrolysis time, the composition of the low density open cell organic foam, and the quantity of the low density open cell organic foam. The pyrolysis temperature is typically from about 600 to 3000° C. In one embodiment, the pyrolysis temperature is from about 800 to about 1150° C. In one embodiment, the pyrolysis temperature is about 1050° C. The pyrolysis time may vary according to the pyrolysis temperature, the composition of the low density open cell organic foam, and the amount of low density open cell organic foam. The pyrolysis time is typically from about 1 to about 6 hours. In one embodiment, the pyrolysis time is from about 2 to about 5 hours. In one embodiment, the pyrolysis time is about 4 hours.

The term "compatible atmosphere," as used herein, pertains to any atmosphere which will permit the high temperature pyrolysis of the low density open cell organic foam to form a low density open cell carbon foam. Usually, the compatible atmosphere is non-oxidizing. A compatible atmosphere may be relatively inert, for example dry nitrogen. (Note that high purity ultra dry nitrogen is often unnecessary, and that standard grade dried nitrogen is usually sufficient.) Alternatively, a compatible atmosphere may be a reducing atmosphere, for example, hydrogen. Concurrent with or subsequent to pyrolysis of the open cell organic foam, additional or substitute gases or vapors may be introduced to derivatize or "activate" the open cell carbon foam. Examples of such materials include steam, air, and carbon dioxide. Subsequent to pyrolysis, the open cell foam may be derivatized or "activated" by chemical components using, for instance, an oxidizing acid such as nitric acid.

The low density open cell carbon foams of the present invention are characterized by relatively large particle and pore sizes, high porosity, high surface area, and high capacitance. Typically, low density open cell carbon foams of the present invention have a density of about 300 to about 900 mg/cm$^3$. Typically, the low density open cell carbon foams of the present invention have a surface area of about 200 to about 800 m$^2$/g. Typically, low density open cell carbon foams of the present invention have an electrical capacitance of about 10 to about 80 F/g.

The low density open cell carbon foams of the present invention are also characterized by a meso-pore size distribution of greater than about 5 nm (i.e., from about 5 to about 50 nm). In one embodiment, the low density open cell carbon foam is characterized by a meso-pore size distribution of greater than about 7 nm (i.e., from about 7 to about 50 nm). In one embodiment, the low density open cell carbon foam is characterized by a meso-pore size distribution of greater than about 10 nm (i.e., from about 10 to about 50 nm). In one embodiment, the low density open cell carbon foam is characterized by a meso-pore size distribution of about 10 to about 25 nm.

Without wishing to be bound to any particular theory, it is postulated that the substantial electrical capacitances observed for the low density open cell carbon foams of the present invention reflects a larger than typical meso-pore size distribution, and that this modified meso-pore size distribution enhances formation of the electrical double layer that gives rise to the energy storage characteristics. Again, it is postulated that the formation of larger than typical particles (at high R/C) may permit the formation of meso-pores within the particles themselves, and thus increase the meso-pore population.

D. Methods For the Preparation of Low Density Open Cell Carbon Foam/Carbon Substrate Composites The present invention also pertains to low density open cell carbon foam/carbon substrate composites, which are prepared by high temperature pyrolysis of a low density open cell organic foam composite, which are prepared from a suitable substrate and an organic gel, as described above. Thus, in one embodiment, the present invention pertains to methods for preparing a low density open cell carbon foam/carbon substrate composite comprising the steps of:

(a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and, (b) infusing a porous carbon substrate or a porous organic substrate (e.g., a fiber or sheet) with said reaction mixture to form an infused carbon or porous organic substrate;

(c) heating said infused porous substrate at a gelation temperature for a gelation time to form an organic gel/porous substrate composite;

(d) heating said organic gel/porous substrate composite at a curing temperature for a curing time to form a cured organic gel/porous substrate composite;

(e) drying said cured organic gel/porous substrate composite to form a low density open cell organic foam/porous substrate composite; and, (f) pyrolyzing said low density open cell organic foam/porous substrate composite at a pyrolysis temperature to form said low density open cell carbon foam/carbon substrate composite.

The terms "porous carbon substrate" and "porous organic substrate," as used herein, pertain to porous materials which comprise carbon and organic material, respectively, and which may be infused, soaked, wetted, or otherwise combined with the reaction mixture. The carbon and organic substrates may be in any shape or configuration, including, for example, forms selected from the group consisting or comprising blocks, sheets, threads or filaments, or tubes, including, for example, forms selected from the group consisting or comprising papers, membranes, felts, reticulated foams, and fabrics, which may further comprise other components, such as metal fibers, metal powders, and the like. In one embodiment, the carbon substrate is a carbon fiber paper, such as Technimat® 6100, -050, which is commercially available from Lydall Technical Papers, Rochester, N.Y. The inventive gels, dried foams, and pyrolyzed product may take the form of the chosen substrate.

The resulting low density open cell carbon foam/carbon substrate composites are particularly useful as electrodes in double layer capacitors for energy storage or for capacitive deionization (see, for example, Pekala et al., 1995b).

E. EXAMPLES

Several embodiments of the present invention are described in the following examples, which are offered by way of illustration and not by way of limitation.

Materials

Resorcinol (98% purity) was obtained from Aldrich Chemical Company and used as received. Formaldehyde was obtained from J. T. Baker Chemical Company as an aqueous solution (37.6%, methanol stabilized). Sodium carbonate monohydrate was obtained from Mallinckrodt, Inc. and a 0.1 M aqueous solution prepared. Water was deionized prior to use.

Characterization Methods

Density

Density was calculated from the measured weight of the porous solid and the geometrically determined volume.

Surface Area and Pore Distribution

The surface area and pore size distributions were obtained using the BET multipoint $N_2$ gas adsorption technique (Micromeritics® ASAP 2000). Organic samples were evacuated at room temperature for 24 hours prior to measurement while carbon samples were evacuated at 200° C. for ~12 hours prior to measurement. Surface areas are typically reported in units of $m^2/g$. Pore size distributions are typically determined from the desorption branch and typically reported in units of nanometers. Meso-pore size distributions reflect the distribution of meso-pores, that is, pores with dimensions from about 2 to about 50 nm.

Capacitance Measurements

Capacitance studies were performed using a 64-channel Maccor® battery tester. Experiments were done using circular (4.5 cm-diameter) Teflon® cells. The two identical 1.5 cm-diameter carbon composite electrodes were separated by 2 pieces of Whatman® fiberglass filter papers (934-AH). Nickel foils were used as current collectors and the electrolyte was 5 M KOH. The entire assembly was sandwiched between 2 Teflon® plates and held together by 0.6 cm-diameter Teflon® screws. Electrolyte filling was accomplished by three successive evacuation (2 psi) and pressurization (24.5 psi) stages in approximately 1 hour. The assembly and testing was carried out under ambient conditions. The capacitance was determined from the discharge capacity (C=Q/V) of cells fully charged at a constant current to the operating voltage of 1 V. The total dry weight of the two carbon electrodes was used in the capacitance density calculations.

Example 1

Monolithic Air-Dried Resorcinol-Formaldehyde Low Density Open Cell Organic Foam R 40% w/v, R/C 2000

12.35 g of resorcinol (0.112 mol), 17.91 g of 37% aqueous formaldehyde (6.63 g, 0.220 mol), and 20.32 g of deionized water were stirred together until the resorcinol was dissolved. Then 0.56 g of a 0.1 M sodium carbonate solution (~0.056 mmol $Na_2CO_3$ assuming a specific gravity of 1 g/cm$^3$) was added with stirring (initial pH=5.6). The final volume was measured to be 47.0 mL. The resulting solution was poured into a polypropylene container and tightly sealed. The container was directly placed into a 50° C. oven for gellation. the reaction mixture gelled and became opaque in 1–2 hours at 50° C. After 12 hours at 50° C., the temperature was then raised to 85° C. and maintained for 72 hours to cure the gel. After cooling to room temperature, the gel was dried by evaporation at 85° in a humid atmosphere for 6 hours followed by drying at 50° C. for 12 hours under an ambient atmosphere. The density of the resulting low density open cell foam was determined to be 0.43 g/cm$^3$.

Example 2

Monolithic Air-Dried Resorcinol-Formaldehyde Low Density Open Cell Organic Foam R 50% w/v, R/C 2000

12.35 g of resorcinol (0.112 mol), 17.91 g of 37% aqueous formaldehyde (6.63 g, 0.220 mol), and 10.76 g of deionized water were stirred together until the resorcinol was dissolved. Then 0.56 g of a 0.1 M sodium carbonate solution (~0.056 mmol $Na_2CO_3$ assuming a specific gravity of 1 g/cm$^3$) was added with stirring (initial pH=5.6). The final volume was measured to be 38.0 mL. The resulting solution was poured equally into two polypropylene containers and tightly sealed (gels A and B). Gel A was then allowed to stand at room temperature for 12 hours and then placed into a 50° C. oven for 12 hours to gel. Gel B was placed directly into a 50° C. oven for 12 hours to gel. In both cases, the RF gels became opaque while gelling at 50° C. The temperature was then raised to 85° C. and maintained for 24 hours to cure. After cooling to room temperature, both gels were dried by slow evaporation in air at room temperature for several days. The density of dried Gel A was determined to be 0.65 g/cm$^3$ and that of dried Gel B was 0.64 g/cm$^3$. The BET surface area of gel A was determined to be 584 m$^2$/g. The average mesopore diameter was determined to be 13 nm.

Example 3

Air-Dried Resorcinol-Formaldehyde Low Density Open Cell Carbon Foam/Carbon Substrate Composite—R 50% w/v, R/C 1000

24.7 g of resorcinol (0.224 mol), 35.82 g of 37% aqueous formaldehyde (13.25 g, 0.441 mol), and 21.52 g of deionized water were stirred together until the resorcinol was dissolved. Then 2.24 g of a 0.1 M sodium carbonate solution (~0.224 mmol $Na_2CO_3$ assuming a specific gravity of 1 g/cm$^3$) was added with stirring. The final volume was measured to be 75.9 mL. The solution was warmed at 50° C. for 30 min. A light weight carbon fiber paper (Technimat® 6100-050, Lydall Technical Papers, Rochester, N.Y.) was then infused with this solution. The infused paper was placed between two glass plates, sealed with a plastic over-wrap, and allowed to stand at room temperature for 15 hours to gel. The RF infused paper was then placed in an 85° C. oven for 24 hours to cure. After cooling, the plastic over-wrap and the glass plates were then removed. The RF composite was placed in a humid horizontal flow oven and dried for 12 hours at ~75° C. The RF composite was a thin opaque sheet (~10 mil. ~0.25 mm thick) with a mottled light brown appearance and a smooth, shiny surface. It had a density of about 0.6 mg/cm$^3$ and a surface area of 494 m$^2$/g.

Pyrolysis of the RF composite at 1050° C. under an inert atmosphere ($N_2$) (room temperature to 250° C. in ~4 hours, 250° C. for 2 hours, 250 to 1050° C. in ~9 hours, 1050° C. for ~4 hours, cool to room temperature in ~12 hours)

resulted in a black carbonized sheet with dimensions comparable to the RF composite. This material had a density of 0.419 mg/cm$^3$ and a surface area of 397 m$^2$/g. This material had a pore size distribution for mesopores of 20 nm. A specific capacitance of ~20.6 F/g was determined when this material was used as an electrode in an aqueous-based (5 M KOH) supercapacitor.

Example 4

Air-Dried Resorcinol-Formaldehyde Low Density Open Cell Carbon Foam/Carbon Substrate Composite—R 50% w/v, R/C 2000

24.7 g of resorcinol (0.224 mol), 35.82 g of 37% aqueous formaldehyde (13.25 g, 0.441 mol), and 22.64 g of deionized water were stirred together until the resorcinol was dissolved. Then 1.12 g of a 0.1 M sodium carbonate solution (~0.112 mmol Na$_2$CO$_3$ assuming a specific gravity of 1 g/cm$^3$) was added with stirring. The final volume was measured to be 75.9 mL. The solution was warmed at 50° C. for 30 min. A light weight carbon fiber paper (Technimat® 6100-050; Lydall Technical Papers, Rochester, N.Y.) was then infused with this solution. The infused paper was placed between two glass plates, sealed with a plastic over-wrap, and allowed to stand at room temperature for 15 hours to gel. The RF infused paper was then placed in an 85° C. oven for 24 hours to cure. After cooling, the plastic over-wrap and the glass plates were then removed. The RF composite was placed in a humid horizontal flow oven and dried for 12 hours at ~75° C. The RF composite was a thin opaque sheet (~10 mil, ~0.25 mm thick) with a mottled light brown appearance and a smooth, shiny surface. It had a density of about 0.6 mg/cm$^3$ and a surface area of 408 m$^2$/g.

Pyrolysis of the RF composite at 1050° C. under an inert atmosphere (N$_2$), resulted in a black carbonized sheet with dimensions comparable to the RF composite. This material had a density of 0.413 mg/cm$^3$ and a surface area of 497 m$^2$/g. This material had a pore size distribution for mesopores of 17 nm. A specific capacitance of ~17.8 F/g was determined when this material was used as an electrode in an aqueous-based (5 M KOH) supercapacitor.

Example 5

Air-Dried Resorcinol-Formaldehyde Low Density Open Cell Carbon Foam/Carbon Substrate Composite—R 60% w/v, R/C 1000

24.7 g of resorcinol (0.224 mol), 38.0 g of 34.8% aqueous formaldehyde (13.22 g, 0.440 mol), and 6.74 g of deionized water were stirred together until the resorcinol was dissolved. Then 2.24 g of a 0.1 M sodium carbonate solution (~0.224 mmol Na$_2$CO$_3$ assuming a specific gravity of 1 g/cm$^3$) was added with stirring. The final volume was measured to be 63.2 mL. A light weight carbon fiber paper (Technimat® 6100-050; Lydall Technical Papers, Rochester, N.Y.) was then infused with this solution. The infused paper was placed between two glass plates, sealed with a plastic over-wrap, and placed into a 50° C. oven for 2 days to gel. The RF infused paper was then placed in an 85° C. oven for 18 hours to cure. After cooling, the plastic over-wrap and the glass plates were then removed. The RF composite was placed in a humid horizontal flow oven and dried for 12 hours at ~75° C. The RF composite was a thin sheet (~10 mil, ~0.25 mm thick) with a very dark red-brown appearance and a flat surface finish. It had a density of about 0.7 mg/cm$^3$.

Pyrolysis of the RF composite at 1050° C. under an inert atmosphere (N$_2$), resulted in a black carbonized sheet with dimensions comparable to the RF composite. This material had a density of 0.453 mg/cm$^3$ and a surface area of 414 m$^2$/g. This material had a pore size distribution for mesopores of 5 nm. A specific capacitance of ~15.7 F/g was determined when this material was used as an electrode in an aqueous-based (5 M KOH) supercapacitor.

Example 6

Air-Dried Resorcinol-Formaldehyde Low Density Open Cell Carbon Foam/Carbon Substrate Composite—R 60% w/v, R/C 2000

24.7 g of resorcinol (0.224 mol), 38.0 g of 34.8% aqueous formaldehyde (13.22 g, 0.440 mol), and 7.86 g of deionized water were stirred together until the resorcinol was dissolved. Then 1.12 g of a 0.1 M sodium carbonate solution (~0.112 mmol Na$_2$CO$_3$ assuming a specific gravity of 1 g/cm$^3$) was added with stirring. The final volume was measured to be 63.2 mL. A light weight carbon fiber paper (Technimat® 6100-050; Lydall Technical Papers, Rochester, N.Y.) was then infused with this solution. The infused paper was placed between two glass plates, sealed with a plastic over-wrap, and placed into a 50° C. oven for 2 days to gel. The RF infused paper was then placed in an 85° C. oven for 18 hours to cure. After cooling, the plastic over-wrap and the glass plates were then removed. The RF composite was placed in a humid horizontal flow oven and dried for 12 hours at ~75° C. The RF composite was a thin sheet (~10 mil, ~0.25 mm thick) with a very dark red-brown appearance and a flat surface finish. It had a density of about 0.8 mg/cm$^3$ and a surface area of 506 m$^2$/g.

Pyrolysis of the RF composite at 1050° C. under an inert atmosphere (N$_2$), resulted in a black carbonized sheet with dimensions comparable to the RF composite. This material had a density of 0.471 mg/cm$^3$ and a surface area of 408 m$^2$/g. This material had a pore size distribution for mesopores of 5 nm. A specific capacitance of ~19.1 F/g was determined when this material was used as an electrode in an aqueous-based (5 M KOH) supercapacitor.

The data for the low density open cell carbon foams obtained in Examples 3, 4, 5, and 6 are summarized below in Table 1. The observed capacitances (~15–20 F/g) are comparable to values observed for conventional carbon aerogels derived from conventional RF aerogels obtained by supercritical or solvent exchange drying of conventional RF gels. The observed densities (~400–500 mg/cm$^3$) illustrate a density comparable conventional carbon aerogels. The meso-pore size distribution for the low density open cell carbon foams of the present invention (~5–20 nm) are notably higher than values observed for conventional carbon aerogels ($\leq$5 nm prepared from high solids content aerogel, e.g., 50% w/v and greater) (see, for example, Tran et al., 1996).

The low density open cell carbon foams of the present invention possess a meso-pore size distribution which is shifted to larger pores, as compared to conventional carbon aerogels. This shift to larger pore size may be important for establishing an electrochemical double layer. The shift may also provide an important advantage over conventional carbon aerogels when using organic electrolyte systems (which have better capacitance characteristics). Organic electrolyte systems typically have electrolyte cations and/or anions which are relatively large which may not be able to fit into the smaller pores of conventional carbon aerogels, reducing their ultimate performance. Increasing the pore size, as in the low density open cell carbon foams of the present invention, permits more of the electrochemical double layer to be formed, and thus improve the performance of the organic electrolyte system.

TABLE 1

Summary of Examples 3–6

| | | | Low Density Open Cell Carbon Foam | | | |
|---|---|---|---|---|---|---|
| Ex. | % w/v | R/C | Density (mg/cm³) | Capacitance (F/g) | Surface Area (m²/g) | Pore Size (nm) |
| 3 | 50 | 1000 | 419 | 20.6 | 397 | 20 |
| 4 | 50 | 2000 | 413 | 17.8 | 497 | 17 |
| 5 | 60 | 1000 | 453 | 15.7 | 414 | 5 |
| 6 | 60 | 2000 | 471 | 19.1 | 408 | 5 |

F. References

The disclosures of the publications, patents, and published patent specifications referenced below are hereby incorporated by reference into the present disclosure to more fully describe the state of the art to which this invention pertains.

Kaschmitter et al., 1993, "Supercapacitors Based on Carbon Foams," U.S. Pat. No. 5,260,855, issued Nov. 9, 1993.

Kaschmitter et al., 1996, "Carbon Foams for Energy Storage Devices," U.S. Pat. No. 5,529,971.

Kong, 1991a, "Low Density Carbonized Composite Foams," U.S. Pat. No. 4,992,254, issued Feb. 12, 1991.

Kong, 1991b, "Low Density Carbonized Composite Foams," U.S. Pat. No. 5,047,225, issued Sep. 10, 1991.

Kong, 1993, "Low Density Carbonized Composite Foams," U.S. Pat. No. 5,232,772, issued Aug. 3, 1993.

Mayer el al., 1993, "The Aerocapacitor: An Electrochemical Double-Layer Energy-Storage Device," *J. Electrochem. Soc.*, 1993, Vol. 140, pp. 446–451.

Mayer et al., 1994, "Doping of Carbon Foams for Use in Energy Storage Devices," U.S. Pat. No. 5,358,802, issued Oct. 25, 1994.

Mayer et al., 1995a, "Method of Low Pressure and/or Evaporative Drying of Aerogel," U.S. Pat. No. 5,420,168, issued May 30, 1995.

Mayer et al., 1995b, "Aquagel Electrode Separator for Use in Batteries and Supercapacitors," U.S. Pat. No. 5,402,306, issued Mar. 28, 1995.

Mayer et al., 1995c, "Cell Separator for Use in Bipolar-Stack Energy Storage Devices," U.S. Pat. No. 5,393,619, issued Feb. 28, 1995.

Mayer et al., 1996, "Organic Aerogel Microspheres and Fabrication Method Therefor," U.S. Pat. No. 5,508,341, Apr. 16, 1996.

Mayer et al., 1997, "Composite Carbon Foam Electrode," U.S. Pat. No. 5,626,977, issued May 6, 1997.

Pekala et al., 1982, "Resorcinol-Formaldehyde Aerogels and Their Carbonized Derivatives," *Polymer Preprints*, Vol. 39, pp. 221–223.

Pekala et al., 1992, "Carbon Aerogels and Xerogels," *Mat. Res. Soc. Symp. Proc.*, Vol. 270, pp. 3–14.

Pekala et al., 1995a, "Method for Making Thin Carbon Foam Electrodes," published international patent application no. WO 95/06002, published Mar. 2, 1995.

Pekala et al., 1995b, "Electrochemical Behavior of Carbon Aerogels Derived from Different Precursors," *Mat. Res. Soc. Symp. Proc.*, Vol. 393, pp. 413–419.

Pekala, 1989a, "Organic Aerogels from the Polycondensation of Resorcinol with Formaldehyde," *J. Materials Science*, Vol. 24, pp. 3221–3227.

Pekala, 1989b, "Low Density, Resorcinol-Formaldehyde Aerogels," U.S. Pat. No. 4,873,218, issued Oct. 10, 1989.

Pekala, 1991, "Low Density, Resorcinol-Formaldehyde Aerogels," U.S. Pat. No. 4,997,804, issued Mar. 5, 1991.

Pekala, 1992, "Melamine-Formaldehyde Aerogels," U.S. Pat. No. 5,086,085, issued Feb. 4, 1992.

Tran et al., 1996, "A Comparison of the Electrochemical Behavior of Carbon Aerogels and Activated Carbon Fiber Cloths," *Mat. Res. Soc. Symp. Proc.*, Vol. 431, pp. 461–465.

I claim:

1. A method for preparing an organic gel, said method comprising the steps of:
   (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 2000; and,
   (b) heating said reaction mixture to form said organic gel.

2. The method of claim 1 wherein, in said forming step, the weight of the hydroxylated benzene compounds and the aldehydes in the reaction mixture with respect to the total volume of the reaction mixture, R, is in the range of 30–80% w/v (weight to volume).

3. The method of claim 1 wherein said one or more hydroxylated benzene compound comprises resorcinol and said one or more aldehydes comprises formaldehyde.

4. The organic gel formed by the method of claim 1.

5. The organic gel formed by the method of claim 2.

6. A method for preparing a cured organic gel, said method comprising the steps of:
   (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 2000; and,
   (b) heating said reaction mixture at a gelation temperature for a gelation time to form an organic gel; and,
   (c) heating said organic gel at a curing temperature for a curing time to form said cured organic gel.

7. The method of claim 6 wherein, in said forming step, the weight of the hydroxylated benzene compounds and the aldehydes in the reaction mixture with respect to the total volume of the reaction mixture, R, is in the range of 30–80% w/v (weight to volume).

8. The method of claim 6 wherein said one or more hydroxylated benzene compound comprises resorcinol and said one or more aldehydes comprises formaldehyde.

9. The cured organic gel formed by the method of claim 6.

10. The cured organic gel formed by the method of claim 7.

11. A method for preparing a low density open cell organic foam, said method comprising the steps of:
   (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 2000; and,
   (b) heating said reaction mixture to form an organic gel; and,
   (c) removing at least a portion of the water from said organic gel to form said low density open cell organic foam.

12. The method of claim 11 wherein, in said forming step, the weight of the hydroxylated benzene compounds and the aldehydes in the reaction mixture with respect to the total volume of the reaction mixture, R, is in the range of 30–80% w/v (weight to volume).

13. The method of claim 11 wherein said one or more hydroxylated benzene compound comprises resorcinol and said one or more aldehydes comprises formaldehyde.

14. The method of claim 11 wherein said step of removing at least a portion of said water comprises a heating step.

15. The low density open cell organic foam formed by the method of claim 11.

16. The low density open cell organic foam formed by the method of claim 14.

17. A method for preparing a low density open cell organic foam, said method comprising the steps of:
   (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 2000; and,
   (b) heating said reaction mixture at a gelation temperature for a gelation time to form an organic gel;
   (c) heating said organic gel at a curing temperature for a curing time to form a cured organic gel; and,
   (d) removing at least a portion of the water from said cured organic gel to form said low density open cell organic foam.

18. The method of claim 17 wherein, in said forming step, the weight of the hydroxylated benzene compounds and the aldehydes in the reaction mixture with respect to the total volume of the reaction mixture, R, is in the range of 30–80% w/v (weight to volume).

19. The method of claim 17 wherein said one or more hydroxylated benzene compound comprises resorcinol and said one or more aldehydes comprises formaldehyde.

20. The method of claim 17 wherein said step of removing at least a portion of said water comprises a heating step.

21. The low density open cell organic foam formed by the method of claim 17.

22. The low density open cell organic foam formed by the method of claim 20.

23. A low density open cell organic foam according to claim 15 characterized by a density of 300 to 900 mg/cm$^3$, a surface area of 200 to 1000 m$^2$/g, and a meso-pore size distribution of 5 to 50 nm.

24. The low density open cell organic foam of claim 23, wherein said low density open cell organic foam is formed by at least partial evaporative removal of water from an organic gel, said organic gel formed by the reaction of one or more hydroxylated benzene compounds and one or more aldehydes in the presence of one or more catalysts and water.

25. The low density open cell organic foam of claim 23, wherein said low density open cell organic foam wherein the meso-pore size distribution is from about 10 to about 50 nm.

26. The low density open cell organic foam of claim 23, wherein said low density open cell organic foam wherein the meso-pore size distribution is from about 10 to about 25 nm.

27. The low density open cell organic foam of claim 23, wherein said low density open cell organic foam is colored orange to deep red.

28. A method for preparing a low density open cell carbon foam, said method comprising the steps of:
   (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 2000; and,
   (b) heating said reaction mixture to form an organic gel;
   (c) drying said organic gel to form a low density open cell organic foam; and,
   (d) pyrolyzing said low density open cell organic foam at a high temperature to form said low density open cell carbon foam.

29. A method for preparing a low density open cell carbon foam, said method comprising the steps of:
   (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 2000; and,
   (b) heating said reaction mixture at a gelation temperature for a gelation time to form an organic gel;
   (c) heating said organic gel at a curing temperature for a curing time to form a cured organic gel;
   (d) removing at least a portion of the water from said cured organic gel to form a low density open cell organic foam; and,
   (e) pyrolyzing said low density open cell organic foam at a pyrolysis temperature to form said low density open cell carbon foam.

30. The low density open cell carbon foam formed by the method of claim 29.

31. A method for preparing a low density open cell carbon foam/carbon substrate composite, said method comprising the steps of:
   (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 2000; and,
   (b) infusing a porous carbon substrate or a porous organic substrate with said reaction mixture to form an infused porous substrate;
   (c) heating said infused porous substrate to a gelation temperature for a gelation time to form an organic gel/porous substrate composite;
   (d) heating said organic gel/porous substrate composite to a curing temperature for a curing time to form a cured organic gel/porous substrate composite;
   (e) removing at least a portion of the water from said cured organic gel/porous substrate composite to form a low density open cell organic foam/porous substrate composite; and,
   (f) pyrolyzing said low density open cell organic foam/porous substrate composite at a pyrolysis temperature to form said low density open cell carbon foam/carbon substrate composite.

32. The low density open cell carbon foam/carbon substrate formed by the method of claim 31.

33. The low density open cell carbon foam/carbon substrate formed by the method of claim 31 wherein the substrate has a form selected from blocks, sheets, threads, filaments, tubes, papers, membranes, felts, reticulated foams, and fabrics.

34. A low density open cell carbon foam according to claim 38 characterized by a density of 300 to 900 mg/cm$^3$, a surface area of 200 to 800 m²/g, a meso-pore size distribution of 5 to 50 nm, and an electrical capacitance of 10 to 80 F/g.

35. The low density open cell carbon foam of claim 34, wherein said low density open cell carbon foam is formed by pyrolysis of a low density open cell organic foam, said low density open cell organic foam formed by at least partial evaporative removal of water from an organic gel, said organic gel formed by the reaction of one or more hydroxylated benzene compounds and one or more aldehydes in the presence of one or more catalysts and water.

36. The low density open cell carbon foam of claim 34, wherein said hydroxylated benzene compound is resorcinol and said aldehyde is formaldehyde.

37. The low density open cell carbon foam of claim 34, having a meso-pore size distribution of 10 to 20 nm.

38. The low density open cell carbon foam formed by the method of claim 28.

39. A method for preparing a low density open cell organic foam, said method comprising the steps of:
    (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and,
    (b) heating said reaction mixture to form an organic gel; and,
    (c) removing at least a portion of the water from said organic gel by simple evaporative drying of water, to form said low density open cell organic foam.

40. The method of claim 39 wherein, in said forming step, the weight of the hydroxylated benzene compounds and the aldehydes in the reaction mixture with respect to the total volume of the reaction mixture, R, is in the range of 30–80% w/v (weight to volume).

41. The method of claim 39 wherein said one or more hydroxylated benzene compound comprises resorcinol and said one or more aldehydes comprises formaldehyde.

42. The low density open cell organic foam formed by the method of claim 39.

43. A method for preparing a low density open cell organic foam, said method comprising the steps of:
    (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and,
    (b) heating said reaction mixture at a gelation temperature for a gelation time to form an organic gel;
    (c) heating said organic gel at a curing temperature for a curing time to form a cured organic gel; and,
    (d) removing at least a portion of the water from said cured organic gel by simple evaporative drying of water, to form said low density open cell organic foam.

44. The method of claim 43 wherein, in said forming step, the weight of the hydroxylated benzene compounds and the aldehydes in the reaction mixture with respect to the total volume of the reaction mixture, R, is in the range of 30–80% w/v (weight to volume).

45. The method of claim 43 wherein said one or more hydroxylated benzene compound comprises resorcinol and said one or more aldehydes comprises formaldehyde.

46. The low density open cell organic foam formed by the method of claim 43.

47. A method for preparing a low density open cell carbon foam, said method comprising the steps of:
    (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and,
    (b) heating said reaction mixture to form an organic gel;
    (c) drying said organic gel by simple evaporative drying of water, to form a low density open cell organic foam; and,
    (d) pyrolyzing said low density open cell organic foam at a high temperature to form said low density open cell carbon foam.

48. The method of claim 47 wherein, in said forming step, the weight of the hydroxylated benzene compounds and the aldehydes in the reaction mixture with respect to the total volume of the reaction mixture, R, is in the range of 30–80% w/v (weight to volume).

49. The method of claim 47 wherein said one or more hydroxylated benzene compound comprises resorcinol and said one or more aldehydes comprises formaldehyde.

50. The low density open cell carbon foam formed by the method of claim 47.

51. A method for preparing a low density open cell carbon foam, said method comprising the steps of:
    (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and,
    (b) heating said reaction mixture at a gelation temperature for a gelation time to form an organic gel;
    (c) heating said organic gel at a curing temperature for a curing time to form a cured organic gel;
    (d) removing at least a portion of the water from said cured organic gel by simple evaporative drying of water, to form a low density open cell organic foam; and,
    (e) pyrolyzing said low density open cell organic foam at a pyrolysis temperature to form said low density open cell carbon foam.

52. The method of claim 51 wherein, in said forming step, the weight of the hydroxylated benzene compounds and the aldehydes in the reaction mixture with respect to the total volume of the reaction mixture, R, is in the range of 30–80% w/v (weight to volume).

53. The method of claim 51 wherein said one or more hydroxylated benzene compound comprises resorcinol and said one or more aldehydes comprises formaldehyde.

54. The low density open cell carbon foam formed by the method of claim 51.

55. A method for preparing a low density open cell carbon foam/carbon substrate composite, said method comprising the steps of:
    (a) forming a reaction mixture comprising one or more hydroxylated benzene compounds, one or more aldehydes, one or more catalysts, and water; wherein the molar ratio of said hydroxylated benzene compounds to said catalysts in said reaction mixture, R/C, is greater than about 1000; and,
    (b) infusing a porous carbon substrate or a porous organic substrate with said reaction mixture to form an infused porous substrate;

(c) heating said infused porous substrate to a gelation temperature for a gelation time to form an organic gel/porous substrate composite;

(d) heating said organic gel/porous substrate composite to a curing temperature for a curing time to form a cured organic gel/porous substrate composite;

(e) removing at least a portion of the water from said cured organic gel/porous substrate composite by simple evaporative drying of water, to form a low density open cell organic foam/porous substrate composite; and, (f) pyrolyzing said low density open cell organic foam/porous substrate composite at a pyrolysis temperature to form said low density open cell carbon foam/carbon substrate composite.

56. The method of claim 55 wherein, in said forming step, the weight of the hydroxylated benzene compounds and the aldehydes in the reaction mixture with respect to the total volume of the reaction mixture, R, is in the range of 30–80% w/v (weight to volume).

57. The method of claim 55 wherein said one or more hydroxylated benzene compound comprises resorcinol and said one or more aldehydes comprises formaldehyde.

58. The low density open cell carbon foam/carbon substrate formed by the method of claim 55.

59. The low density open cell carbon foam/carbon substrate formed by the method of claim 55 wherein the substrate has a form selected from blocks, sheets, threads, filaments, tubes, papers, membranes, felts, reticulated foams, and fabrics.

60. A low density open cell organic foam characterized by a density of 300 to 900 mg/cm$^3$, a surface area of 200 to 1000 m$^2$/g, and a meso-pore size distribution of 5 to 50 nm.

61. The low density open cell organic foam of claim 60, wherein said low density open cell organic foam is formed by at least partial evaporative removal of water from an organic gel, said organic gel formed by the reaction of one or more hydroxylated benzene compounds and one or more aldehydes in the presence of one or more catalysts and water.

62. The low density open cell organic foam of claim 60, wherein said low density open cell organic foam wherein the meso-pore size distribution is from about 10 to about 50 nm.

63. The low density open cell organic foam of claim 60, wherein said low density open cell organic foam wherein the meso-pore size distribution is from about 10 to about 25 nm.

64. The low density open cell organic foam of claim 60, wherein said low density open cell organic foam is colored orange to deep red.

65. A low density open cell carbon foam characterized by a density of 300 to 900 mg/cm$^3$, a surface area of 200 to 800 m$^2$/g, a meso-pore size distribution of 5 to 50 nm, and an electrical capacitance of 10 to 80 F/g.

66. The low density open cell carbon foam of claim 65, wherein said low density open cell carbon foam is formed by pyrolysis of a low density open cell organic foam, said low density open cell organic foam formed by at least partial evaporative removal of water from an organic gel, said organic gel formed by the reaction of one or more hydroxylated benzene compounds and one or more aldehydes in the presence of one or more catalysts and water.

67. The low density open cell carbon foam of claim 65, wherein said hydroxylated benzene compound is resorcinol and said aldehyde is formaldehyde.

68. The low density open cell carbon foam of claim 65, having a meso-pore size distribution of 10 to 20 nm.

* * * * *

UNITED STATES PATENT AND TRADEMARK OFFICE
CERTIFICATE OF CORRECTION

PATENT NO. : 5,945,084
DATED : Aug. 31, 1999
INVENTOR(S) : Michael W. Droege

It is certified that error appears in the above-identified patent and that said Letters Patent is hereby corrected as shown below:

Column 1, line 60, "acrogels" should be --aerogels--.

Column 2, line 17, "open cells foams" should be --open cell foams--.

Column 2, line 21, "spacings pores" should be --spacings, pore--.

Column 2, line 40, "open cells foams" should be --open cell foams--.

Column 2, line 54, "open cells foams" should be --open cell foams--.

Column 2, line 58, "spacings,pores" should be --spacings, pore--.

Column 4, line 26, "dissolved in a an" should be --dissolved in an--.

Column 4, line 48, insert --,-- after 1993.

Column 4, line 49, "in variety" should be --in a variety--.

Column 5, line 24, delete "." after "100 nm."

Column 5, line 10, "(e.g., 900 m$^2$/g)" should be --(e.g., ~900 m$^2$/g)--.

Column 5, line 48, "distribution of $\leqq$7 nm" should be -- distribution of $\leq$7 nm --.

UNITED STATES PATENT AND TRADEMARK OFFICE
CERTIFICATE OF CORRECTION

PATENT NO. : 5,945,084
DATED : August 31, 1999
INVENTOR(S) : Michael W. Droege

Page 2 of 2

It is certified that error appears in the above-identified patent and that said Letters Patent is hereby corrected as shown below:

Column 9, line 17, "had avolume" should be --had a volume--.

Column 11, line 30, insert --to-- after "according."

Column 11, line 38, insert --to-- after "according."

Column 14, line 62, "6100, -050," should be --6100-050,--.

Column 16, line 2, "gellation. the" should be --gellation. The--.

Column 16, line 61, "(~10 mil. ~0.25 mm thick)" should be --(~10 mil, ~0.25 mm thick)--.

Column 18, line 22, "(Technimat(®" should be --(Technimat®--.

Column 18, line 54, "aerogels (≤5 nm" should be --(≤5 nm--.

Column 19, line 51, "Apr. 16, 1996" should be --issued Apr. 16, 1996--.

Signed and Sealed this

Twenty-third Day of May, 2000

Attest:

Q. TODD DICKINSON

Attesting Officer

Director of Patents and Trademarks